(12) United States Patent
Ström et al.

(10) Patent No.: US 9,813,839 B2
(45) Date of Patent: Nov. 7, 2017

(54) INTERMEDIATE NETWORK NODE PROVIDING A SERVICE TO A MOBILE TERMINAL IN A WIRELESS COMMUNICATIONS NETWORK

(71) Applicant: Telefonaktiebolaget LM Ericsson (publ), Stockholm (SE)

(72) Inventors: Jacob Ström, Stockholm (SE); Pål Frenger, Linköping (SE); Hugo Tullberg, Nyköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/103,013

(22) PCT Filed: Dec. 12, 2013

(86) PCT No.: PCT/SE2013/051498
§ 371 (c)(1),
(2) Date: Jun. 9, 2016

(87) PCT Pub. No.: WO2015/088409
PCT Pub. Date: Jun. 18, 2015

(65) Prior Publication Data
US 2016/0316310 A1 Oct. 27, 2016

(51) Int. Cl.
*H04W 4/00* (2009.01)
*H04L 29/08* (2006.01)
(Continued)

(52) U.S. Cl.
CPC ........... *H04W 4/001* (2013.01); *H04L 1/0018* (2013.01); *H04L 49/355* (2013.01);
(Continued)

(58) Field of Classification Search
CPC . H04L 67/2804; H04L 67/34; H04L 67/2842; H04L 67/288; H04L 67/289;
(Continued)

(56) References Cited

U.S. PATENT DOCUMENTS

| 6,775,536 | B1 * | 8/2004 | Geiger | G06F 21/51 |
| | | | | 455/411 |
| 2002/0072355 | A1 * | 6/2002 | Jeong | G06F 8/65 |
| | | | | 455/419 |

(Continued)

FOREIGN PATENT DOCUMENTS

WO  WO 2013/175170  11/2013

OTHER PUBLICATIONS

International Search Report, PCT Application No. PCT/SE2013/051498, dated Aug. 5, 2014.
(Continued)

*Primary Examiner* — Meless Zewdu
(74) *Attorney, Agent, or Firm* — Sage Patent Group (57) ABSTRACT

A method and intermediate network node provide a service requested by a mobile terminal in a wireless communications network. The intermediate network node has a processing unit and a memory containing instructions executable by the processing unit. The intermediate network node receives a first request for a service from the mobile terminal, and receives application software configured to be executed at the intermediate network node to provide the mobile terminal with at least part of the requested service. The intermediate network node provides the mobile terminal with the at least part of the requested service. A subsequent request related to the service of the mobile terminal terminates at the intermediate network node, and provides the mobile terminal with at least part of the service requested in the subsequent request on behalf of a provider of the service.

32 Claims, 3 Drawing Sheets

(51) Int. Cl.
  *H04W 4/20* (2009.01)
  *H04L 1/00* (2006.01)
  *H04L 12/931* (2013.01)
  *H04W 36/02* (2009.01)
  *H04W 4/02* (2009.01)
  *H04W 84/04* (2009.01)
  *H04W 88/02* (2009.01)

(52) U.S. Cl.
  CPC ...... *H04L 67/2804* (2013.01); *H04L 67/2861* (2013.01); *H04L 67/34* (2013.01); *H04W 4/003* (2013.01); *H04W 4/20* (2013.01); *H04W 36/02* (2013.01); *H04L 67/288* (2013.01); *H04L 67/289* (2013.01); *H04L 67/2842* (2013.01); *H04W 4/02* (2013.01); *H04W 84/042* (2013.01); *H04W 88/02* (2013.01)

(58) Field of Classification Search
  CPC . H04L 1/0018; H04L 49/355; H04L 67/2861; H04L 29/08; H04L 12/931; H04L 1/00; H04W 4/20; H04W 4/001; H04W 4/003; H04W 4/02; H04W 84/042; H04W 36/02; H04W 88/02; H04W 4/00; H04W 4/185; H04W 28/0215; H04W 4/18
  See application file for complete search history.

(56) References Cited

U.S. PATENT DOCUMENTS

| | | | | |
|---|---|---|---|---|
| 2003/0145038 A1* | 7/2003 | Bin Tariq | ............ | H04L 65/4084 709/202 |
| 2004/0157562 A1* | 8/2004 | Ovaskainen | ........ | H04L 67/2804 455/67.11 |
| 2010/0034089 A1* | 2/2010 | Kovvali | .............. | H04L 67/2842 370/235 |
| 2010/0262619 A1* | 10/2010 | Zargahi | ..................... | G06F 8/61 707/770 |
| 2011/0185354 A1* | 7/2011 | Tanner | ...................... | G06F 8/61 717/178 |
| 2012/0072481 A1 | 3/2012 | Nandlall et al. | | |
| 2012/0197765 A1* | 8/2012 | Kim | ................... | G06Q 30/0601 705/27.1 |
| 2013/0003708 A1* | 1/2013 | Ko | ......................... | H04W 4/18 370/338 |
| 2013/0097660 A1* | 4/2013 | Das | ........................ | H04L 63/10 726/1 |
| 2013/0311551 A1 | 11/2013 | Thibeault | | |
| 2014/0150096 A1* | 5/2014 | Moon | ................... | G06F 21/645 726/22 |
| 2014/0219179 A1* | 8/2014 | Zakrzewski | ............ | H04W 4/18 370/328 |
| 2014/0344061 A1* | 11/2014 | Choi | ................. | G06Q 30/0267 705/14.64 |

OTHER PUBLICATIONS

Written Opinion of the International Searching Authority, PCT Application No. PCT/SE2013/051498, dated Aug. 5, 2014.
Gerhard P. Fettweis, TU Dresden, The Tactile Internet, Published on May 20, 2013, Retrieved from the internet at URL http://www.youtube.com/watch?v=_VXEPzQgpok, (specifically 28 minutes into video).

* cited by examiner

INTERMEDIATE NETWORK NODE PROVIDING A SERVICE TO A MOBILE TERMINAL IN A WIRELESS COMMUNICATIONS NETWORK

CROSS REFERENCE TO RELATED APPLICATION

This application is a 35 U.S.C. §371 national stage application of PCT International Application No. PCT/SE2013/051498, filed on 12 Dec. 2013, the disclosure and content of which is incorporated by reference herein in its entirety. The above-referenced PCT International Application was published in the English language as International Publication No. WO 2015/088409 A1 on 18 Jun. 2015.

TECHNICAL FIELD

The invention relates to a method at an intermediate network node of providing a service requested by a mobile terminal in a wireless communications network and the intermediate network node performing the method. The invention further relates to a computer program and a computer program product.

BACKGROUND

With the increasing use of software applications (referred to as "apps") designed to run on smartphones, tablets and other mobile device, users are generally interacting with their smartphones in two different ways; either through native apps running on their phones (downloaded apps or apps available when the phone is purchased) or using a browser and a web page, possibly implemented in the phone as a so called web app.

A native app is installed directly onto the device, and users typically acquire these apps through an online store. Native apps run fast and smoothly on the user's device since (a) the data used by the app can be stored locally, (b) native code, such as a compiled C source code, can be used instead of interpreted code (e.g. JavaScript), and (c) the programmer has access to application programming interfaces (APIs) to render graphics quickly using a built-in graphics processing unit (GPU).

Instead of using a native app, the user can choose to visit a web page using a browser or a web app. Many services today can be accessed both ways; for instance, Facebook can be accessed by using a native app as well as by visiting the Facebook homepage from the browser. Historically, browsing was quite slow, since every click resulted in a request to the web server, and the user would have to wait for the content to return. Today, small scripting programs typically written in JavaScript are downloaded to the user device and run locally. This means that tedious round-trip times of the network often can be avoided and JavaScript based web-pages can be almost as responsive as a native app. While native apps still have an advantage when it comes to high-demanding applications such as games, the gap between web apps and native apps has been narrowing.

However, a problem that is similar to both native apps and web apps is that they are typically slow when they need to contact a server to obtain information. As an example, the Facebook app may be fast when scrolling is undertaken, but when a feed is to be updated, a message saying "updating . . . " may appear for several seconds before the feed updates. Another example is a bank app; the user interface may be quick and responsive within the app, but as soon as the user tries to access his or her transactions, several seconds will lapse before the information is actually shown on the screen.

The latency experienced by the user can be divided into three categories: latency that comes from execution speed on the user device itself, latency that comes from the wireless network, i.e., the Radio Access Network (RAN), and latency that comes from the network connecting the RAN with the providers of services, e.g., internet. The first type of latency can be more or less eliminated by using a well programmed native app on the device. In the case of a web app the JavaScript code will execute a bit slower but should still not be generating latencies that are in the order of seconds. The latency for the wireless network can be significant, but modern wireless access technologies have greatly reduced latencies. The remaining latency is that of the Internet itself, i.e., the round-trip-time from the cellular network to the server that hosts the content or provides a service and back to the cellular network again.

As wireless access technologies have become faster, the Internet latency is starting to dominate.

SUMMARY

An object of the present invention is to solve, or at least mitigate, one or more of these problems in the art and provide an improved method and network node for providing a mobile terminal with a service in a wireless communications network.

This object is attained in a first aspect of the present invention by a method at an intermediate network node of providing a service to a mobile terminal in a wireless communications network. The method comprises receiving a first request for the service from the mobile terminal, and receiving an application software configured to be executed at the intermediate network node to provide the mobile terminal with at least part of the requested service. Further, the method comprises providing the mobile terminal with the at least part of the requested service, wherein a subsequent request related to the service of the mobile terminal terminates at the intermediate network node, and providing, from the intermediate network node, the mobile terminal with at least part of the service requested in said subsequent request on behalf of a provider of the service.

This object is attained in a second aspect of the present invention by an intermediate network node in a wireless communications network for providing a service to a mobile terminal. The intermediate network node comprises a processing unit and a memory containing instructions executable by the processing unit, whereby the intermediate network node is operative to receive a first request from the service of the mobile terminal, and receive application software configured to be executed at the intermediate network node to provide the mobile terminal with at least part of the requested service. The intermediate network node is further operative to provide the mobile terminal with the at least part of the requested service, wherein a subsequent request related to the service of the mobile terminal terminates at the intermediate network node, and provides the mobile terminal with at least part of the service requested in the subsequent request on behalf of a provider of the service.

Advantageously, by executing an application software at an intermediate network node, in particular a node of the wireless communications network, such as a base station or a controlling node, it is not necessary to run a native app on the mobile terminal to access a service associated with the native app; instead the functionality of the native app will taken over by the application software executing on the intermediate network node. Thus, the request of the mobile terminal to access the service will terminate at the intermediate network node, and the intermediate network node will provide the requested service to the mobile terminal on behalf of a provider of the particular service. Further advantageous is that a user of the mobile terminal need not communicate via a browser with a possibly slow web server over a possibly slow internet in order to access a particular service provided by a server; instead the intermediate network node will act as an agent for the server in that the application software executing on the intermediate network node will provide the requested service to the mobile terminal on behalf of the provider of the particular service. The application software may be pushed onto the intermediate network node from a number of other network nodes in the wireless communication network, as will be discussed with reference to various embodiments of the present invention in the following.

Thus, the problem in the art of slow communication channels using web browsers and/or web apps is solved by pushing the application software, which will be referred to as a "base station app" in the following, onto the intermediate network node such that the intermediate node can respond to a request for a service from the mobile terminal on behalf of a provider of the requested service initially addressed by the mobile terminal.

The advantages of the present invention over the prior art is even more evident in view of state of the art communication technologies such as, e.g., the fourth generation (4G) mobile communication network Long Term Evolution (LTE), which operate with considerably lower latency than previous generations of networks such as third generation (3G) network Universal Mobile Telecommunications System (UMTS) and second generation (2G) network Global System for Mobile Communications (GSM). The air interface in LTE is operating with latencies around 10 ms, which is significantly quicker than previous generations of networks. In the generation after LTE, researchers in the field are aiming at air-interface roundtrip times of around 1 ms, which is fast enough for swift feedback in an app.

However, as air interfaces have become progressively faster, latency has remained the same in other parts of the system, and thus, relatively speaking, become worse. It is estimated that less than 50% of the latency comes from the cellular system, but is instead a result of latencies in the Internet itself caused by slow routing and/or slow internet servers. The present invention is thus highly advantageous in that communication between the mobile terminal and, e.g., a service provided by a server is avoided by having an intermediate network node download and execute application software and communicate with the mobile terminal on behalf of a provider of the service originally residing on the server.

In an embodiment of the present invention, the intermediate network node communicates with a server providing the particular service in response to the request received from the mobile terminal, and further receives the application software from the particular service. This embodiment will be exemplified by a use case in the following.

Assuming that a user employs a User Equipment (UE) in the form of a mobile terminal such as, e.g., a smart phone, tablet, laptop, etc., for accessing a particular service of a service provider, in this case an Internet banking service provided by her bank for checking her account balance. Thus, the intermediate network node, being for instance a base station, receives a request for the Internet banking service of the mobile terminal. The user may for instance enter via her smart phone the web page of the Internet banking service provided by her bank or use a native Internet banking app on her smart phone, and the communication between the web server of the bank and the user equipment is routed via the base station. The server providing the request, i.e., the web server of the bank, will in response to the request push application software onto the base station, and this application software is configured to be executed at the base station to provide the smart phone with the requested service in the form of the current account balance. The base station thus provides the smart phone with the requested service, and any subsequent request related to the particular Internet banking service from the smart phone (or even from a login of the user on some other UE such as her tablet) will terminate at the base station (and not be routed to the web server of the bank), said base station providing the smart phone with the service requested in the subsequent requests on behalf of the web server initially providing the particular Internet banking service. It should be noted that even though the request of the UE terminates at the base station, the base station could—and will in many cases—communicate with the web server on behalf of the UE, thus solving the problem of having the UE communicate over a slow Internet connection. In some cases, the base station may forward the request to the web server, but the communication of the UE still terminates at the base station thereby avoiding the slow Internet infra structure. For instance, a user may want to transfer money to a friend, and information relating to the transfer request is sent to the bank for accounting purposes, while the actual effecting of the transfer between accounts is undertaken by the base station app.

In an alternative embodiment, the intermediate node receives a request from the mobile terminal for a particular service, but in this alternative embodiment, the application software configured to be executed at the intermediate network node to provide the mobile terminal with the requested data is pushed onto the intermediate node from the mobile terminal itself. Thereafter, the process proceeds as in the previously described embodiment. Advantageously, in case for example a base station experiences a slow Internet connection, but that the speed of its air interface towards the mobile terminal is high, round-trip delay is reduced since the base station can download the application software from the mobile terminal, thereby making the software application installation process faster. Further advantageous is that the user for example could employ apps created by herself and which are not available on any app store. This assumes that the base station is capable of executing such an app. It could also be that the base station is required to provide a trusted environment for executing user apps for protecting the base station against malicious apps provided by users.

Advantageously, with these embodiments of the present invention, after the base station app has been set up at an intermediate network node, the smart phone is no longer communicating directly with the web server but instead with the intermediate node. The software application executed by the intermediate network node (the "base station app") will in its turn communicate with the web server over an Internet connection possibly suffering from high latency, while the latency of the communication between the smart phone and the base station app is the latency of the air interface. A responsive communication between the smart phone and the base station app is thus provided for.

It should be noted that under some circumstances, a direct communication between the phone app and the web server may still be allowed in addition to the communication mediated through the intermediate node.

In still a further embodiment, the intermediate network node preloads data associated with the particular service from the server. For instance, in line with the previously discussed use case, after the base station app has been downloaded and installed at the base station, and the requested service has been provided to the smart phone, the base station may turn, even on a regular basis, to the web server of the bank in order to preload the current account balance such that the current account balance advantageously can be provided swiftly to the smart phone upon request. It should be noted that the preloaded data not necessarily is provided to the smart phone; if no further request is received for the service with which the preloaded data is associated (possibly within a stipulated time period) the base station may discard the preloaded data in order to free up storage space. Again, slow communication over the Internet is avoided since the preloaded data associated with the request already resides at the base station upon smart phone request. A major advantage is that the preloaded data does not consume radio resources unless it is requested by the phone app. This preloading may therefore increase the user's experience through reduced latencies without wasting precious radio capacity. It should be noted that the developer of the service in question, who may be developing not only the web server software and the software running in the phone, would typically develop the software for the base station app as well. This developer can thus design the preloading functionality in the base station app to best suit the particular service in question. For instance, if the service is related to news, the web service may push news information to the base station app, and functionality in the base station app may decide to store this information for a time period, such as a number of hours. If the service is the above-mentioned banking service, the base station app may decide to preload the account balance and e.g. the last 25 transactions as soon as the user starts the banking app on her phone. Generally, the more data that is associated with the requested service, the more advantageous the preloading embodiment is. In for instance gaming applications, a great amount of data may need to be transferred between the server and the base station; by having such data preloaded and available at the base station upon request of the mobile terminal, substantial round-trip times can be avoided.

In yet a further embodiment of the present invention, the intermediate network node receives instructions from the server on how to generate data associated with the particular service locally to subsequently be supplied to the mobile station. Assuming for instance that a user of a mobile terminal regularly uses a newspaper app, i.e. the users renders an electronic version of the newspaper; with the downloaded base station app, the base station is enabled to generate, e.g., a first page of the newspaper such that it can be built locally at the base station. Advantageously, it is thus only necessary to download news data from the newspaper web server to the base station app, and an updated first page can thus be supplied to the smart phone upon request with very low latency. At the same time, no radio resources have been sacrificed if the user did not read the news before it was discarded by the base station, as would have been the case if the data were preloaded in the phone itself. Another example may be a Facebook phone app running on a user's smart phone. It may be paired with a Facebook base station app that at fixed intervals in time downloads the latest status updates from the web server to the base station app. Only when the Facebook phone app is started is this data delivered from the base station app to the phone app. Again, the quick response times have been achieved without wasting precious radio resources when the service is not used.

Furthermore, the intermediate network node may alternatively or additionally receive instructions from the mobile terminal on how to generate data associated with the particular service locally to be supplied to the mobile station in response to a subsequent request. For instance, assuming that the generation of the data to be supplied to the mobile station is processing-heavy, it is advantageous to have the base station app handling this burden, instead of the mobile terminal. Moreover, if the base station app is not only used for forwarding data from the server, but further used to perform e.g. calculations, it may not be necessary to communicate with the server at all, or at least not for longer periods of time. This could be embodied for example by a gaming application executed at the base station where pixel data is sent to the mobile terminal such that the visual experience of the user of the phone is that the game is rendered on the phone itself, but where the processing-heavy part of the gaming application in fact is performed at the base station. This embodiment could advantageously be combined with the previously discussed embodiment where the base station app is downloaded from the mobile terminal, in which case a great deal of processing may be undertaken without communicating via the web server over a potentially slow Internet channel.

In still a further embodiment of having the mobile terminal instruct the base station, the app running on the mobile terminal may trigger the base station app running on the base station to perform an action such as loading data from the web server. As an example, when the user starts a Facebook app on the phone, the first thing that happens is that the Facebook phone app signals to the Facebook base station app that preloading is necessary. The base station app immediately addresses the web server and downloads not only the type of information that should be available on a first screen displayed to the user; i.e. the latest status updates in the feed, but also all the items that are not visible there, but which can be found a few user-clicks away. These items could include Facebook messages (which the user can access by navigating the screen), images from the feed in high resolution (which the user has to click at to see), etc.

Conversely, the base station app may signal the phone app to wake up from idle mode. In the Facebook example, the base station app can be given information from the web server that someone has posted something on the user's wall. The base station app may then preload this posting and other data that the phone app will need in order to render the wall, and then notify the phone app, which will cause the phone to beep. The user will now be able to access the wall posting very quickly.

In another embodiment of the present invention, the intermediate network node (or some other appropriate network node) estimates or determines what data the mobile terminal is likely to request in a subsequent request and preloads or locally generates the data which is most likely to be requested in the subsequent request. As an example, in the Facebook example mentioned above, the base station app may be responsible for determining which data should be preloaded and in what order. For instance, the Facebook base station app may choose to preload messages before high resolution images since the latter will take longer to transfer and may undesirably block the transmission of the messages. Since the developer creates the Facebook base station app together with the Facebook phone app, there are ample opportunities to make such optimizations.

In a further embodiment of the present invention, the intermediate network node sends an intermediate network node identifier to the server providing the particular service. The server may need to know the identity of the intermediate node (e.g. a base station) and what capabilities it has. This can be solved by having the base station intercept a Hypertext Transfer Protocol (HTTP) get request from the smart phone. The base station then forwards the http-get request along with additional information to the web server, perhaps in the form of http header information. In this header, the base station specifies information such as to which network operator it belongs, the identifier of the base station, base station capabilities, etc. The web server can thus contact the operator owning the base station and negotiate whether or not it is allowed to transfer the base station app from the web server to the base station. Alternatively, the web server negotiates directly with the base station.

In a further embodiment, in case a mobile terminal is to be handed over from a first base station to a second base station, the base station app is pushed onto the second base station, optionally along with any data associated with the service requested from the mobile terminal by the first base station already executing the base station app, such as any of the preloaded data, or any of the locally generated data.

In still another embodiment of the present invention, the intermediate network node acquires a position of the mobile terminal, and adapts the requested service provided to the mobile terminal on the basis of the acquired position of the mobile terminal. Advantageously, information such as local advertisements or local news may be provided to the user of the mobile terminal along with the requested service.

The present invention further relates to a computer program comprising computer-executable instructions for causing a device to perform steps of the method according to the present invention when the computer-executable instructions are executed on a processing unit included in the device.

Moreover, the present invention relates to a computer program product comprising a computer readable medium, the computer readable medium having the computer program embodied therein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
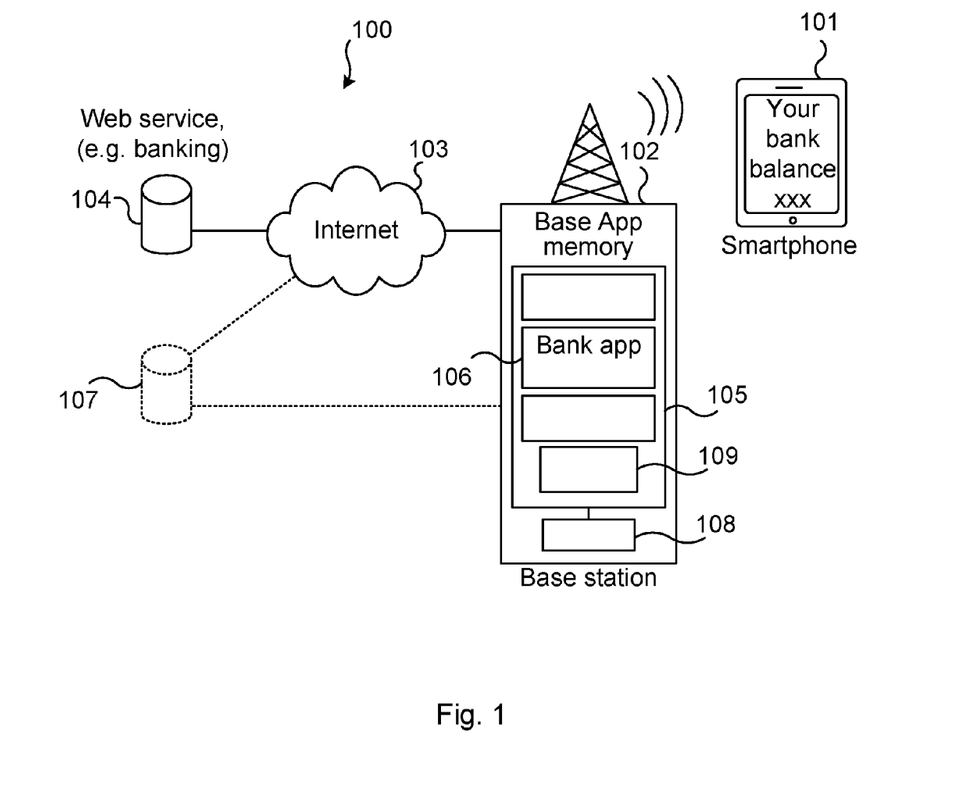
FIG. 1 illustrates a communications network comprising an intermediate network node according to an embodiment of the present invention.

FIG. 1 illustrates a communications network 100 comprising an intermediate network node according to an embodiment of the present invention, which is embodied in this particular example by a base station 102.

A wireless mobile terminal 101, such as a smart phone, communicates with the base station 102 over an air interface. The intermediate node according to embodiments of the present invention is exemplified in the form of a base station 102 since it typically is the network node being closest to the smart phone 101 in the communications network 100. Thus, the intermediate network node 102 is typically arranged in a Radio Access Network (RAN) of the communications network 100.

To further exemplify, in case the communications network 100 pertains to a 4G Long Term Evolution (LTE) network, the intermediate network node 102 is typically an evolved NodeB (eNodeB) located in a so called Evolved Universal Mobile Telecommunications System (UMTS) Radio Access Network (E-UTRAN). Should the communications network 100 pertain to a 3G UMTS network, the intermediate network node 102 is typically a NodeB or a Radio Network Controller (RNC) located in a so called UMTS Radio Access Network (UTRAN). If the communications network 100 pertain to a 2G Global System for Mobile Communications (GSM), the intermediate network node 102 is typically a Base Transceiver Station (BTS) or a Base Station Controller (BSC) located in a so called GSM Enhanced Data for Global Evolution (EDGE) Radio Access Network (GERAN). Numerous network types can be envisaged where the present invention may be implemented.

The base station 102 communicates with a server 104 providing one or more services via the Internet 103. The method according to embodiments of the present invention performed at the base station 102 is in practice performed by a processing unit 108 embodied in the form of one or more microprocessors arranged to execute a computer program 109 downloaded to a suitable storage medium 105 associated with the microprocessor, such as a Random Access Memory (RAM), a Flash memory or a hard disk drive. The processing unit 108 is arranged to carry out the method according to embodiments of the present invention when the appropriate computer program 109 comprising computer-executable instructions is downloaded to the storage medium 105 and executed by the processing unit 108. The storage medium 105 may also be a computer program product comprising the computer program 109. Alternatively, the computer program 109 may be transferred to the storage medium 105 by means of a suitable computer program product, such as a floppy disk or a memory stick. As a further alternative, the computer program 109 may be downloaded to the storage medium 105 over a network. The processing unit 108 may alternatively be embodied in the form of a digital signal processor (DSP), an application specific integrated circuit (ASIC), a field-programmable gate array (FPGA), a complex programmable logic device (CPLD), etc.

Now, when a user of the smart phone 101 wishes to access a service, such as an Internet banking service provided by a service provider in the form of a bank hosting a web server 104 where the service physically resides, the user sends a first request to this effect via the smart phone 101. The request for the service is received at the base station 102, which in practice could be, e.g., a request of the user to check her account balance, said request being submitted by the user for instance by entering the web page of the Internet banking service provided by her bank or by using a native Internet banking app on her smart phone 101. The base station 102 contacts the web server 104 via the Internet 103, which responds by delivering application software (i.e. the "base station app") to the base station 102, and this application software is configured to be executed at the base station 102 to provide the smart phone 101 with the requested service in the form of the current account balance.

Thus, the base station app 106 is loaded into the memory 105 of the base station 102 to subsequently be executed by the processing unit 108 in order to provide the smart phone 101 with the requested account balance. Advantageously, when a subsequent request related to the Internet banking service is made by the user of the smart phone 101, such as for instance requesting a more current account balance or even requesting a bank transfer to be effectuated, the requested service is provided by the base station 102 by executing the downloaded base station app 106. The subsequent request of the smart phone 101 thus terminates at the base station 102, and the user need not traverse a potentially slow Internet for communication with the web server 104. The base station 102 thus provides the smart phone 101 with the requested service, and any subsequent request related to the service from the smart phone (or even from a login of the user on some other UE such as her tablet) will terminate at the base station 102 and not be routed to the web server 104 of the bank. Instead, the base station 102 provides the smart phone 102 with the service of the subsequent request on behalf of the particular Internet banking service. It should be noted that the base station app 106 may have to fetch data related to the subsequent request from the server 104, in particular in case of sensitive data such as bank information. For instance, as previously discussed, the user may want to transfer money to a friend or some other party. However, in other types of applications, where security is less of an issue, the base station app 106 itself may host data related to the subsequent request in the memory 105 of the base station 102.

In embodiments of the present invention, data associated with the service requested by the smart phone 101 is preloaded by the base station 102 into the memory 105. For instance, after the base station app 106 has been downloaded and installed in the memory 105 of the base station 102, and the requested service has been provided to the smart phone 101, the base station 102 may turn, possibly on a regular basis, to the web server 104 of the bank in order to preload data in the form of the current account balance associated with the Internet banking service such that the current account balance advantageously can be provided swiftly to the smart phone 101 upon receipt of a subsequent service request from the smart phone 101. If no subsequent request is made for the service (possibly within a stipulated time period), the data preloaded into the memory 105 is discarded and storage space is freed up. This will advantageously speed up the response time for a service request further, as the data associated with the service request already resides in the memory 105 at the base station 102 upon a request from the smart phone 102. It will however not consume costly radio resources unless the data is actually requested from the smart phone 102.

In this context, another embodiment is envisaged where data associated with the requested service in fact is generated at the base station 102 (possibly in combination with the previously described embodiment of preloading data fetched from the web server 104). The base station 102 hence receives instructions from the web server 104 or the smart phone 101 (or some other appropriate network node) on how to generate data associated with the requested service locally to subsequently be supplied to the smart phone 101. In an example, the user of the smart phone 101 regularly uses a newspaper phone app where the user can read an electronic version of the newspaper. With the downloaded base station app 106, the base station 102 is enabled to generate a first page of the newspaper such that it can be built locally at the base station 102 and stored in the memory 105. Advantageously, it is thus only necessary to download updated news data from the newspaper web server 104 to the base station app 106 at the base station 102, and an updated first page can thus be supplied to the smart phone 101 upon request with very low latency. At the same time, no radio resources have been sacrificed if the user does not read the news before it possibly is discarded by the base station 102 to free up memory space, as would have been the case if the data were preloaded in the phone 101 itself. Numerous applications can be envisaged where the present embodiment of locally generating data at the base station 102 is implemented, such as for instance a previously described Facebook application.

With further reference to FIG. 1 and the embodiment described pertaining to locally generating data associated with a requested service at the base station 102, the base station 102 is in a further embodiment of the present invention instructed by the web server 104 or the smart phone 101 on how to generate the data, for example in a case where the base station app 106 and the processing unit 108 are responsible for performing demanding calculations common with respect to gaming applications. The service provided would in such an example typically be, e.g., to calculate and provide the smart phone 101 with pixel data, which is a burdensome process in terms of processing power. This embodiment can advantageously be combined with the embodiment where the base station app 106 is provided to the base station 102 by the smart phone 101 itself. Thus, the smart phone 101 pushes the base station app 106 onto the base station 102, after which the process of providing the requested service continues as has been described in the above with reference to FIG. 1. Advantageously, in case the base station 102 experiences a slow Internet 103 connection, but the speed of its air interface towards the smart phone 101 is high, round-trip delay is reduced since the base station 102 can load the base station app 106 into the memory 105 from the smart phone 101, thereby making the software application installation process faster. Further advantages related to the feature of having the smart phone 101 push the base station app 106 onto the base station 102 for installation in the base station memory 105 include scalability, version control and testing, as well as digital rights managements and UE energy consumption.

Firstly, regarding scalability, if the base station app 106 is pushed from the smart phone 101 directly to the base station 102, the central web server 104 does not necessarily need to be contacted, at least not when the app 106 is loaded into the base station memory 105. Central servers, such as the web server 10, risk being overloaded with an overwhelming number of requests, potentially from all over the world. For instance, a small company developing a blockbuster app with rapid spread may not be able to scale up a web server structure quickly enough. Furthermore, given the short life times of many apps, the company are likely to have server over-capacity as when the public interest of the app is on the wane.

Secondly, regarding version control and testing, it is important that the app version in the smart phone 101 and in the base station 102 are compatible, or that they at least are tested against each other. In case the app version in the smart phone 101 is older than the one provided by the web server 104 to the base station 102, it may be necessary to update the app in the smart phone 101. This is something the user may find undesirable; e.g. the cost, delay, or manual input required for the app to be updated may not be acceptable at a particular time and place (or even possible). In that case an app server, such as the web server 104, would need to store not only the most recent version of an app, but also all previous versions. With several billions of apps already on the market today, this solution may not scale well. If both parts of the app are instead located in the smart phone 101 (i.e. both the part executed inside the smart phone 101 and the part executed in the base station 102), or whatever UE being used, and the base station app 106 is transferred from the smart phone 101 to the base station 102, then the two parts can be expected to work together.

Thirdly, regarding Digital Rights Management (DRM), an advantage for the user to be able of uploading parts of the app to the base station 102 is that in that case the user "owns" the app and possesses all the code needed to run the app. A serial number can be embedded in both parts of the app such that the base station part 106 of the app is limited to work only together with a particular paired mobile version of the same app having the same serial number. In case it is possible to download the base station app 106 from the web server 104 directly to the base station 102, than the company that sold the app may not be able to check if the user that wants to load the app onto a particular base station is actually allowed to execute the app.

Fourthly, regarding UE energy consumption and operational cost; one benefit of executing some computational heavy parts of an app in the base station 102 and not in the smart phone 101 is that the energy consumption is transferred from a battery powered device to a power grid connected device. Thus in case a particular UE (e.g. a laptop) runs on batteries, it may be desirable to move heavy computations to the base station, but not if the UE is connected to the power grid.

The computational service in the network 100 may also be associated with an additional cost that the user may or may not want to pay. If the user is at home or at work the cost may zero, but if the user is at another location there might be a cost associated with executing the app in the base station.

With respect to the preloading and/or local generation of data associated with a service requested by the smart phone 101, the base station 102 (or some other appropriate network node) estimates or determines what data the smart phone 101 is likely to request and preloads or locally generates the data which is most likely to be requested. As an example, in the Facebook example mentioned above, the base station app may be responsible for determining which data should be preloaded and in what order. For instance, the Facebook base station app may choose to preload messages before high resolution images since the latter will take longer to transfer and may undesirably block the transmission of the messages.

In FIG. 1, a further optional network node 107 is indicated with dashed lines representing a network operator 107. As has been described, in an embodiment, the web server 104 pushes the base app 106 onto the base station 102. However, for the web server 104 to be able to do so, it is important that the web server 104 knows that the smart phone 101 is actually connected via a base station 102 that allows such access. If, for example, the smart phone 101 is instead connected using WiFi, the smart phone 101 will connect to a local access point (not shown), and thus bypass the base station 102 for Internet 103 access. Further, the web server 104 must know which base station 102 (out of a number of potential base stations) serves the smart phone 101, and possibly what capabilities the base station 102 has. This can be solved by having the base station 102 intercept an http-get request from the smart phone 101. The base station 102 then forwards the http-get request along with additional information to the web server 104, perhaps in the form of http header information. In this header, the base station 102 specifies information such as to which network operator 107 it belongs, the identifier of the base station, base station capabilities, etc. The web server 104 can thus optionally contact the operator 107 owning the base station 102 and negotiate whether or not it is allowed to transfer the base station app 106 from the web server 104 to the base station 102 for installation in the base station memory 105. Alternatively, the web server 104 negotiates directly with the base station 102.

Alternatively, a special app on the smart phone 101 with the appearance of a regular browser is used, but every time the user visits a web page, information is also forwarded to the operator 107, such that the operator 107 can identify which base station 102 the smart phone 101 is camping on and informs the web server 104 accordingly. Based on this information provided by the operator 107, the web server 104 can push the base station app 106 onto the base station 102. Yet another solution is to have a "portal" web server that is owned by the operator 107 via which all base station apps must be started. The portal web server can subsequently push, or help the web server 104 push, the base station app 106 onto the base station 102.

Figure 2:
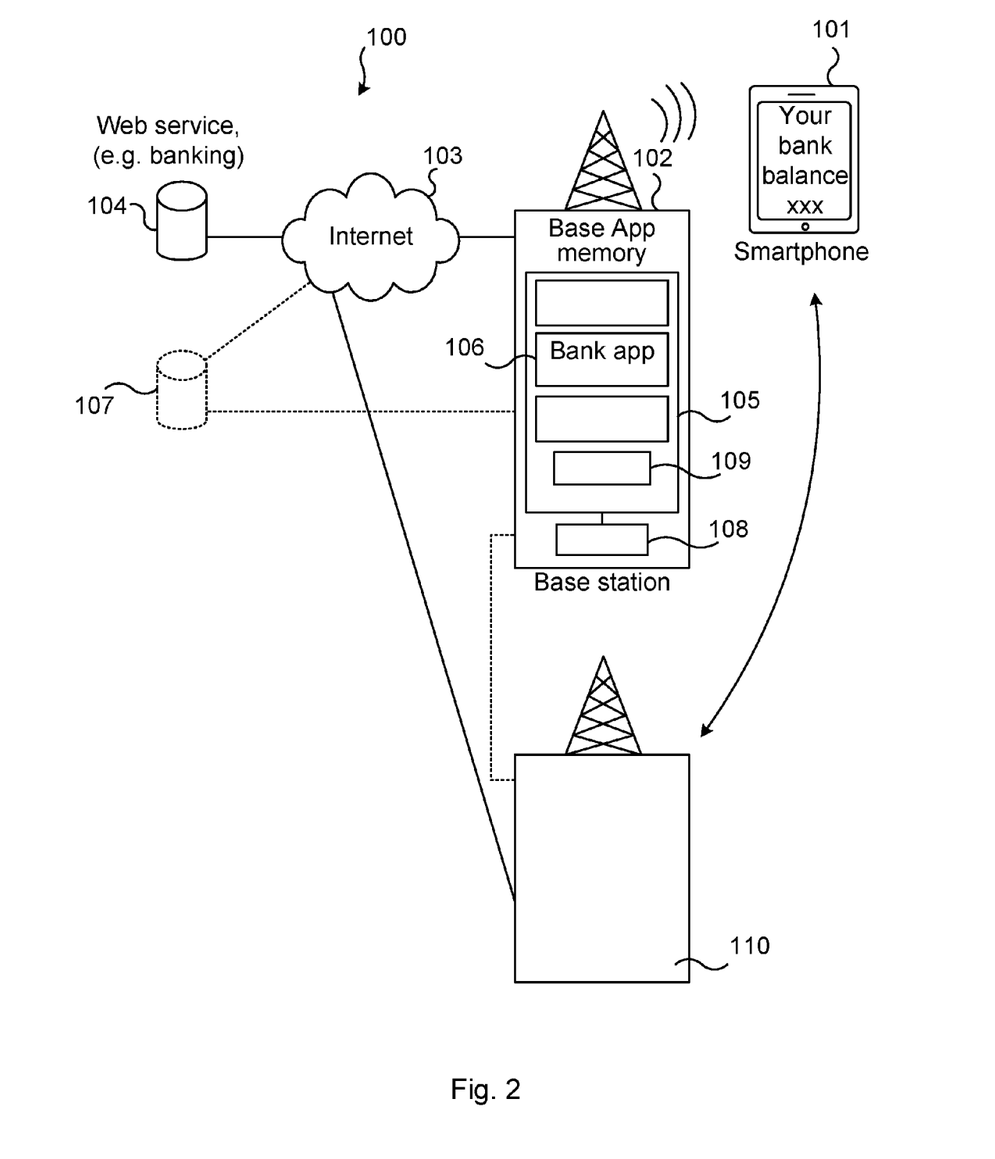
FIG. 2 illustrates the communications network of FIG. 1, but where a second base station further is included to which the mobile terminal is handed over according to an embodiment of the present invention.

FIG. 2 illustrates the network 100 of FIG. 1, but where a second base station 110 further is included. Even though not shown in FIG. 2, the second base station 110 is typically equipped with the same hardware as the (first) base station 102. In an embodiment of the present invention, in case the smart phone 101 is to be handed over from the first base station 102 to the second base station 110, the base station app 106 is pushed onto the second base station 110, optionally along with any data associated with the requested service to be provided to the smart phone 101 by the second base station 110 to which the smart phone 101 is handed over (e.g. preloaded data or locally generated data). It should be noted that the base station app 106 may be transferred from the first base station 102 to the second base station 110, or alternatively duplicated such that it remains on the first base station 102 while being installed on the second base station 110. The base station app 106 can be pushed directly onto the second base station 110 from the first base station 102, or via the Internet 103. It can even be envisaged that the web server 104 pushes the base station app 106 onto the second base station 110, or any other appropriate network node. For example, should the communications network 100 pertain to a UMTS network, the base station app 106 could preferably be transferred from the first base station 102 (in that case referred to as a NodeB) via a base station supervising unit referred to as the RNC to the second base station 110, all three entities being part of the UTRAN.

Figure 3:
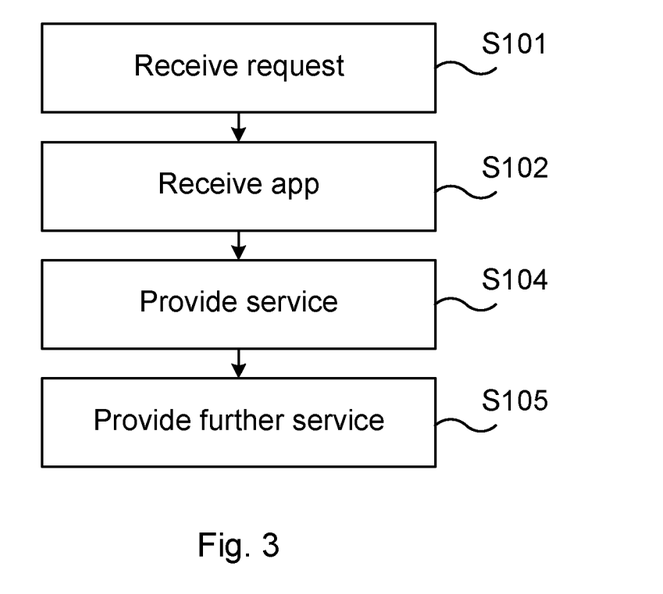
FIG. 3 illustrates a flowchart of a method according to an embodiment of the present invention.

FIG. 3 illustrates a flowchart of a method at an intermediate network node, preferably a network node in a RAN, such as the base station 102 discussed with reference to FIG. 1, of providing a service requested by a mobile terminal 101 in a wireless communications network 100. Thus, in a first step S101, the base station 102 receives the request for service of the mobile terminal 101. Further, in step S102, the base station 102 receives application software 106 configured to be executed at the base station 102 to provide the mobile terminal 101 with at least part of the requested service, e.g. a current account balance of an Internet banking service. As has been discussed, the application software 106, the base station app, could be received from a web server 104, the mobile terminal 101 or any other appropriate network node. Subsequently, in step S103, the base station 102 provides the mobile terminal 101 with the at least part of the requested service, and any subsequent request related to the service of the mobile terminal 101 terminates at the base station 102 in order to avoid having the mobile terminal 101 communicate over a potentially slow Internet connection. In a further step S104, in response to the subsequent request(s), the base station 102 provides the mobile terminal 101 with at least part of the service requested in the subsequent request on behalf of a provider 104 of the service.

It should be noted that in view of the description of embodiments of the present invention given in the above, the execution of the base station app 106 may start at the web server 104 and may then later be moved to the base station 102, which is within the scope of the invention as defined by the appended claims. Further, if another UE starts using the same base station app 106 residing on the base station 102, the UE can use the app that is up and running (or optionally use a second instance of the app if it is designed as a multi user app) and fill it with data as preferred by a user of the UE, rather than initiating the complete process from and load the base station app 106 all over again. Moreover, the base station 102 can hold several base station apps running at the same time. Of course, there will be a practical limit as to how many such apps can be running simultaneously at a base station due to for instance limited processing and memory capabilities. However, not all end users are likely to be accessing the apps at the same time. This means that it will be possible to time share these resources. For instance, when a user shuts down an application on the smart phone 101, the corresponding base station app 106 in the base station 102 can also be closed down (i.e. uninstalled and deleted from the memory 105), leaving room for another base station app from another or the same user in the memory 105. Another example is that when a user is not using the app on the smartphone 101 for a number of seconds, for instance when rendering the service provided by the base station 102, or deciding what smart phone key to press, the base station can set the corresponding base station app 106 in an idle mode, freeing up storage space in the memory 105. Possibly, status of the base station app 106 when entering idle mode may have to be stored such that the base station app 106 subsequently can be resumed to a pre-idle state.

Figure 4:
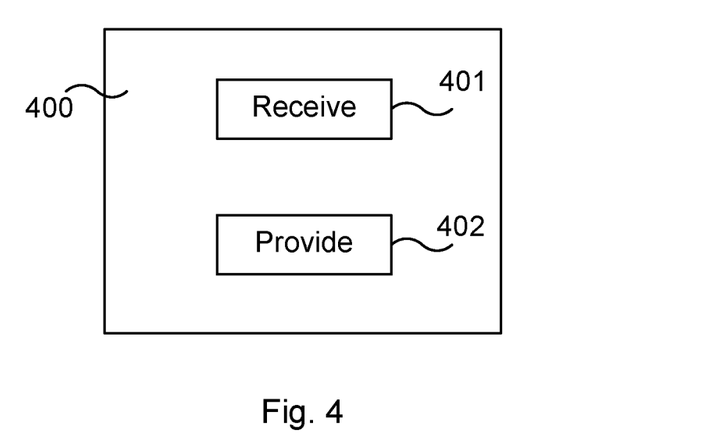
FIG. 4 illustrates an intermediate network node according to an embodiment of the present invention.

FIG. 4 shows an intermediate network node 400 providing a service to a mobile terminal in a wireless communications network according to an embodiment of the present invention. The network node 400 comprises receiving means 401 adapted to receive a first request for the service from the mobile terminal and further to receive an application software configured to be executed at the intermediate network node 400 to provide the mobile terminal with at least part of the requested service. Moreover, the network node 400 comprises providing means 402 adapted to provide the mobile terminal with said at least part of the requested service, wherein a subsequent request related to the service received from the mobile terminal terminates at the intermediate network node, and further adapted to provide the mobile terminal with at least part of the service requested in said subsequent request on behalf of a provider of the service. The receiving means 401 and the providing means 402 may comprise a communications interface for receiving information from and sending information to the mobile terminal and the provider of the service. The network node 400 may further comprise a local storage. The receiving means 401 and the providing means 402 may (in analogy with the description given in connection to FIG. 1) be implemented by a processor embodied in the form of one or more microprocessors arranged to execute a computer program downloaded to a suitable storage medium associated with the microprocessor. The receiving means 401 and the providing means 402 may comprise one or more transmitters and/or receivers and/or transceivers, comprising analogue and digital components and a suitable number of antennae for radio communication, and could even be comprised in the same functional unit, such as a transceiver.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a network node of a Radio Access Network of providing a service to a mobile terminal in a wireless communications network, the method comprising:
   receiving a first request for the service from the mobile terminal;
   in response to the first request received from the mobile terminal, communicating with a server providing the requested service;
   receiving an application software from the server providing the requested service, the application software configured to be executed at the network node to provide the mobile terminal with at least part of the requested service, wherein the application software is provided by the server responsive to the communicating;
   providing the mobile terminal with said at least part of the requested service by executing the application software at the network node responsive to the first request;
   receiving a second request related to the service from the mobile terminal wherein the second request is subsequent to the first request; and
   providing, from the network node, the mobile terminal with at least part of the service requested in said second request on behalf of a provider of said service by executing the application software at the network node, wherein the second request terminates at the network node.

2. The method according to claim 1, wherein the step of communicating with the server further comprises:
   submitting to the server an identifier of the network node.

3. The method according to claim 1, further comprising:
preloading, at the network node, data associated with the requested service.

4. The method according to claim 3, wherein the step of providing the mobile terminal with the at least part of the service requested comprises:
providing the mobile terminal with the preloaded data.

5. The method according to claim 1, further comprising:
receiving, at the network node, instructions on how to generate data associated with the requested service locally at the network node to be supplied to the mobile terminal.

6. The method according to claim 5, wherein the instructions on how to generate data is received from the server.

7. The method according to claim 5, wherein the instructions on how to generate data are received from the mobile terminal.

8. The method according to claim 5, wherein the step of providing the mobile terminal with the requested service comprises:
providing the mobile terminal with the locally generated data.

9. The method according to claim 3, further comprising:
receiving, at the network node, instructions on how to obtain the data associated with the requested service at the network node.

10. The method according to claim 1, further comprising:
determining what data the mobile terminal is likely to request in said subsequent request; and
preloading or locally generating the data which is most likely to be requested in said subsequent request.

11. The method according to claim 1, further comprising:
detecting whether a handover of the mobile terminal is to be made to another network node of the Radio Access network; and
transferring the application software, and any preloaded data or any locally generated data to said another network node.

12. The method according to claim 1, further comprising:
acquiring, at the network node, a position of the mobile terminal; and
adapting the requested data provided to the mobile terminal on the basis of the acquired position of the mobile terminal.

13. The method according to claim 1, further comprising:
receiving from the mobile terminal an indication that no further requests for the service will be made; and
uninstalling the application software in response to the received indication that no further requests will be made.

14. The method according to claim 1, further comprising:
receiving a request for the service from a further mobile terminal;
providing, by executing the application software, the further mobile terminal with at least part of the service requested on behalf of the provider of the service.

15. The method of claim 1 wherein the network node is a network base station node of the Radio Access Network.

16. The method of claim 11 wherein said network node and said another network node are network base station nodes.

17. A network node of a Radio Access Network for providing a service to a mobile terminal, comprising a processing unit and a memory, said memory containing instructions executable by said processing unit, whereby said network node is configured to perform operations to:
receive a first request for the service from the mobile terminal;
communicate with a server providing the service in response to the request received from the mobile terminal;
receive application software from the server providing the requested service, the application software configured to be executed at the network node to provide the mobile terminal with at least part of the requested service, wherein the application software is provided by the server responsive to the communicating;
provide the mobile terminal with said at least part of the requested service by executing the application software responsive to the first request;
receiving a second request related to the service from the mobile terminal wherein the second request is subsequent to the first request; and
provide the mobile terminal with at least part of the service requested in said second request on behalf of a provider of said service by executing the application software, wherein the second request terminates at the network node.

18. The network node of claim 17 wherein the network node and said another network node are network base station nodes.

19. The network node according to claim 18, further configured to:
submit to the server an identifier of the node.

20. The network node according to claim 18, further configured to:
preload data associated with the requested service.

21. The network node according to claim 20, further configured to:
provide the mobile terminal with the preloaded data.

22. The network node according to claim 18, further configured to:
receive instructions on how to generate data associated with the requested service locally at the network node to be supplied to the mobile terminal.

23. The network node according to claim 22, wherein the instructions on how to generate data are received from the server.

24. The network node according to claim 22, wherein the instructions on how to generate data are received from the mobile terminal.

25. The network node according to claim 22, further configured to:
provide the mobile terminal with the locally generated data.

26. The network node according to claim 20, further configured to:
receive instructions on how to obtain the data associated with the requested service.

27. The network node according to claim 18, further configured to:
determine what data the mobile terminal is likely to request in said subsequent request; and
preload or locally generate the data which is most likely to be requested in said subsequent request.

28. The network node according to claim 18, further configured to:
detect whether a handover of the mobile terminal is to be made to another network node; and
transfer the application software and any preloaded data or any locally generated data to said another network node.

29. The network node according to claim 18, further configured to:
- acquire, at the network node, a position of the mobile terminal; and
- adapt the requested data provided to the mobile terminal on the basis of the acquired position of the mobile terminal.

30. The network node according to claim 18, further configured to:
- receive from the mobile terminal an indication that no further requests for the service will be made; and
- uninstalling the application software in view of the received indication that no further requests will be made.

31. The network node according to claim 18, further configured to:
- receive a request for the service from a further mobile terminal;
- providing, by executing the application software, the further mobile terminal with at least part of the service requested on behalf of the provider of the service.

32. The network node of claim 18 wherein the network node is a network base station node.

* * * * *